(12) United States Patent
Sato et al.

(10) Patent No.: US 7,790,782 B2
(45) Date of Patent: Sep. 7, 2010

(54) RESIN COMPOSITION

(75) Inventors: Noritaka Sato, Kanagawa (JP);
Tsutomu Noguchi, Kanagawa (JP);
Hiroyuki Mori, Kanagawa (JP)

(73) Assignee: Sony Corporation (JP)

( * ) Notice: Subject to any disclaimer, the term of this patent is extended or adjusted under 35 U.S.C. 154(b) by 578 days.

(21) Appl. No.: 10/512,491

(22) PCT Filed: May 7, 2003

(86) PCT No.: PCT/JP03/05697

§ 371 (c)(1),
(2), (4) Date: May 16, 2005

(87) PCT Pub. No.: WO03/095556

PCT Pub. Date: Nov. 20, 2003

(65) Prior Publication Data

US 2006/0106130 A1 May 18, 2006

(30) Foreign Application Priority Data

May 9, 2002 (JP) ............... 2002-134253

(51) Int. Cl.
*C08L 67/00* (2006.01)
*H02B 1/00* (2006.01)
(52) U.S. Cl. ............... 523/124; 525/418; 525/437; 361/600
(58) Field of Classification Search ........... 523/124, 523/418, 437
See application file for complete search history.

(56) References Cited

U.S. PATENT DOCUMENTS 6,409,956 B1 * 6/2002 Flandrin et al. .......... 264/328.1
2001/0024354 A1 * 9/2001 Mori et al. .................. 361/600

FOREIGN PATENT DOCUMENTS

| DE | EP 952 183 | * 10/1999 |
| EP | 0 282 072 A2 | 9/1988 |
| JP | 04-366152 A | 12/1992 |
| JP | 09-278991 A | 10/1997 |
| JP | 10-158369 A | 6/1998 |
| JP | 11-005849 A | 1/1999 |
| JP | 11-116783 A | 4/1999 |
| JP | 11-349844 A | 12/1999 |
| JP | 1999-349844 A | 7/2000 |
| JP | 2001-244645 A | 9/2001 |
| JP | 2001-261797 A | 9/2001 |

OTHER PUBLICATIONS

Irgazin DPP Red BO data sheet.*
Nucleating Agents. Stuart Fairgrieve. 2007.*

* cited by examiner

*Primary Examiner*—Marc S Zimmer
*Assistant Examiner*—Noah Frank
(74) *Attorney, Agent, or Firm*—Lerner, David, Littenberg, Krumholz & Mentlik, LLP

(57) ABSTRACT

A resin composition for molding, added with a nucleating agent suitable for promoting crystallization of a polyester capable of having a crystal structure, and in particular of a biodegradable polyester, and a molded product containing, the resin composition for molding thus improved in the crystallinity has either a cyclic compound expressed by general formula (I):

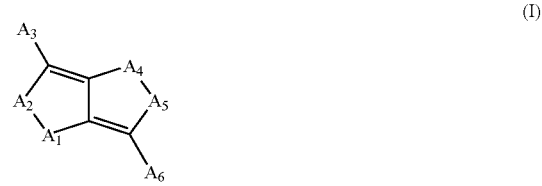

(I)

(where each of $A_1$, $A_2$, $A_4$ and $A_5$ commonly or independently expresses —CO— or —NH—, each of $A_3$ and $A_6$ commonly or independently expresses hydrogen, halogen, optionally-substituted aliphatic group or optionally-substituted aromatic group) and having both of —CO— and —NH— in the molecule, or a mixture of (i) a cyclic compound having —CO— but no NH in the molecule and (ii) a cyclic compound having no —CO— but NH in the molecule, together with the polyester capable of having a crystal structure.

12 Claims, No Drawings

RESIN COMPOSITION

TECHNICAL FIELD

The present invention relates to a resin composition, and more specifically to a resin composition for molding, a method of preparing the same, and applications of the same. In particular, the present invention relates to a resin composition for molding containing a biodegradable resin, a method of preparing the same, and applications of the same.

BACKGROUND ART

In recent years, there are growing demands for biodegradable resin which can decompose in the natural environment, and molded products using the same from the viewpoint of environmental preservation. In particular, much efforts have been directed to investigations into biodegradable resins such as aliphatic polyester. Among others, polylactic acid generally has a high melting point (170 to 180° C.), and molded products of polylactic acid, which are transparent in general, have phased into practical use in some applications. General molded products of polylactic acid are, however, disadvantageous in that they have only a poor heat resistance, and will deform at temperatures above the glass transition point (Tg) which generally appears around 60° C. It is generally believed that the heat resistance up to 80° C. or around is necessary if they are going to be applied to enclosures or structural members of electric appliances. Extensive investigations are therefore in progress in order to make it possible to use them in applications in which heat resistance is required. It is to be understood that heat resistance referred herein means such as being sufficiently high in the rigidity (viscoelasticity) at around 80° C.

As one effort of raising the heat resistance of biodegradable polyester, addition of an inorganic filler is investigated. Heat-resistant mica is an example of the inorganic filler under investigation. This is aimed at improving mechanical characteristics of resin and hardening it through addition of a heat-resistant, hard inorganic filler, just like reinforcing concrete with steel bar. For example, talc, a kind of inorganic filler, is also known to promote crystallization of polylactic acid. It is therefore considered to be useful as a powerful nucleating agent in some applications. Problems may, however, arise in that a sufficient effect of the nucleating agent is obtainable only in an amount of addition of several tens of percent, and in that a larger amount of addition may embrittle the resin composition. The amount of addition of this level also results in whitening of the resin composition, so that transparency is not expectable.

Polylactic acid, a representative of biodegradable polyester, is a polymer capable of having a crystal structure, but general molded products thereof are likely to deform by heat due to its amorphous nature. One exemplary measure for raising the heat resistance under investigation is to crystallize polylactic acid by annealing during or after the molding process. This is aimed at hardening the resin through crystallization, and making it less causative of heat deformation. Addition of so-called nucleating agent is also under investigation for the purpose of promoting the crystallization in this case. Another known problem is that crystallization of polylactic acid by the general methods results in a crystal size of polylactic acid of only as large as microns to sub-millimeters, wherein the polylactic acid crystal per se is causative of scattering of light and makes the resin turbid and ruins the transparency.

The above-described nucleating agent can act as a primary crystal nucleus of a crystalline polymer, and can promote crystal growth of the crystalline polymer. In a broader sense, it is sometimes defined also as a substance for promoting crystallization of crystalline polymers. That is, also substances which increase the rate of crystallization per se are occasionally referred to as nucleating agents.

Addition of the nucleating agent of the former type to a resin results in micronization of the polymer crystal, and this successfully improves rigidity or transparency of the resin. Crystallization during molding can accelerate an overall rate (time) of the crystallization, and this also improves the moldability, which is typified by shortening of the molding cycle.

The above-descried effects can be observed in practical examples of other crystalline resins. For example, polypropylene (abbreviated as PP, hereinafter) has successfully been improved in the rigidity and transparency through addition of a nucleating agent, and the PP thus improved in the physical properties has been practiced in a variety of molded products. One known example of the nucleating agent is sorbitol-base substance, wherein a three-dimensional network created by the substance is considered as exhibiting a good effect, although the action mechanism thereof remains partially unclear. A nucleating agent of metal salt type for PP has already been put into practical use. Examples of this sort of nucleating agent include aluminum hydroxy-di(t-butyl benzoate), sodium bis (4-t-butylphenyl)phosphate, and sodium methylene-bis(2,4-di-t-butylphenyl)phosphate.

Investigations have also been made on nucleating agents for promoting crystallization of aliphatic polyesters. For example, Japanese Patent Application Publication No. HEI 10-158369 discloses a sorbitol-base substance. The substance has already been proven as a nucleating agent for PP, and is described that it can effectively act on polylactic acid when added thereto. Other methods of promoting crystallization of polyester through addition of the nucleating agent are disclosed typically in Japanese Patent Application Publications No. HEI 9-278991, No. HEI 11-5849, No. HEI 11-116783 and so forth. None of the investigations, however, have not successfully been practiced due to insufficient effects.

It is therefore an object of the present invention to provide a resin composition for molding, added with a nucleating agent suitable for promoting crystallization of polyester capable having a crystal structure, and in particular of biodegradable polyester. It is also an object of the present invention to provide a molded product containing the resin composition for molding thus improved in the crystallinity.

DISCLOSURE OF THE INVENTION

After extensive investigations for solving the above-described problems, the present inventors found out that crystallization of polyester, capable of having a crystal structure, was successfully promoted by adding a cyclic compound expressed by general formula (I) below:

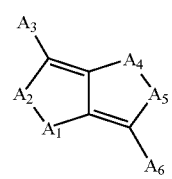

(I)

[where each of $A_1$, $A_2$, $A_4$ and $A_5$ commonly or independently expresses —CO— or —NH—, each of $A_3$ and $A_6$ commonly or independently expresses hydrogen, halogen, optionally-substituted aliphatic group, or optionally-substituted aromatic group] and having both of —CO— and —NH— in the molecule, or by adding a mixture of (i) a cyclic compound having —CO— but no NH in the molecule and (ii) a cyclic compound having no —CO— but NH in the molecule. The present inventors also found that the above-described cyclic compound is preferably 1,4-diketo-2,5-dihydro-3,6-diphenylpyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-diketo-2,5-dihydro-3,6-di-(m-methylphenyl)pyrrolo[3,4-c]pyrrole or 1,4-diketo-2,5-dihydro-3-(p-methylphenyl)-6-(m-methylphenyl)pyrrolo[3,4-c]pyrrole.

The present inventors still also found that amount of addition of the cyclic compound to the resin composition preferably falls within a range from 0.001 to 10 parts by weight per 100 parts by weight of the polyester capable having a crystal structure.

It was also found that the polyester capable of having a crystal structure is preferably a biodegradable polyester. Among others, polylactic acid is more preferable.

It was still also found that addition of an inorganic filler, which is preferably talc, in addition to the cyclic compound is successful in promoting the crystallization without canceling their effects with each other.

It was found that amount of addition of the inorganic filler preferably falls within a range from 1 to 50 parts by weight per 100 parts by weight of the polyester capable of having a crystal structure.

It was also found that addition of a hydrolysis suppressing agent to the resin composition for molding is successful in suppressing hydrolysis of the polyester without degrading the crystallinity. Compounds having a carbodiimide group were found to be appropriate as the hydrolysis suppressing agent.

The present inventors also found that the resin composition for molding according to the present invention has an advanced level of crystallization, and molded products using the same are improved in the rigidity and so forth, which proves suitability of the resin composition for mold production.

Further investigations have lead the present inventors to complete the present invention.

That is, the present invention relates to:

(1) a resin composition containing either a cyclic compound expressed by general formula (I) below:

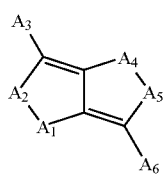

(I)

[where each of $A_1$, $A_2$, $A_4$ and $A_5$ commonly or independently expresses —CO— or —NH—, each of $A_3$ and $A_6$ commonly or independently expresses hydrogen, halogen, optionally-substituted aliphatic group or optionally-substituted aromatic group] and having both of —CO— and —NH— in the molecule, or a mixture of (i) a cyclic compound having —CO— but no NH in the molecule and (ii) a cyclic compound having no —CO— but NH in the molecule, together with polyester capable of having a crystal structure;

(2) the resin composition as described in (1), wherein $A_1$ represents —CO—, $A_2$ represents —NH—, $A_4$ represents —CO—, and $A_5$ represents —NH—;

(3) the resin composition as described in (1), wherein particle size of the cyclic compound falls in a range not larger than 10 μm;

(4) the resin composition as described in (1), wherein the polyester capable of having a crystal structure is a biodegradable polyester;

(5) the resin composition as described in (4), wherein the biodegradable polyester is polylactic acid;

(6) the resin composition as described in (1), wherein the resin composition is intended for use in molding;

(7) the resin composition as described in (1), wherein the cyclic compound is any one of 1,4-diketo-2,5-dihydro-3,6-diphenylpyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-diketo-2,5-dihydro-3,6-di-(m-methylphenyl)pyrrolo[3,4-c]pyrrole and 1,4-diketo-2,5-dihydro-3-(p-methylphenyl)-6-(m-methylphenyl)pyrrolo[3,4-c]pyrrole, and wherein the polyester is polylactic acid;

(8) the resin composition as described in (1), wherein ratio of blending of the cyclic compound falls in a range from 0.001 to 10 parts by weight per 100 parts by weight of the polyester capable of having a crystal structure;

(9) the resin composition as described in (1), further added with an inorganic filler;

(10) the resin composition as described in (9), wherein the inorganic filler is talc;

(11) the resin composition as described in (9), wherein ratio of blending of the inorganic filler falls in a range from 1 to 50 parts by weight per 100 parts by weight of the resin composition for molding;

(12) the resin composition as described in (1), further containing a hydrolysis suppressing agent;

(13) the resin composition as described in (12), wherein the hydrolysis suppressing agent contains a compound having a carbodiimide group;

(14) a method of manufacturing a resin composition comprising a step of mixing either a cyclic compound expressed by general formula (I) below:

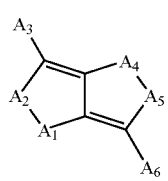

(I)

[where each of $A_1$, $A_2$, $A_4$ and $A_5$ commonly or independently expresses —CO— or —NH—, each of $A_3$ and $A_6$ commonly or independently expresses hydrogen, halogen, optionally-substituted aliphatic group or optionally-substituted aromatic group] and having both of —CO— and —NH— in the molecule, or a mixture of (i) a cyclic compound having —CO— but no NH in the molecule and (ii) a cyclic compound having no —CO— but NH in the molecule, together with polyester capable of having a crystal structure;

(15) a molded product containing a resin composition, wherein the resin composition containing either a cyclic compound expressed by general formula (I) below:

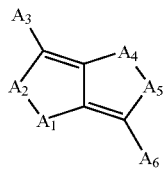
(I)

[where each of $A_1$, $A_2$, $A_4$ and $A_5$ commonly or independently expresses —CO— or —NH—, each of $A_3$ and $A_6$ commonly or independently expresses hydrogen, halogen, optionally-substituted aliphatic group or optionally-substituted aromatic group] and having both of —CO— and —NH— in the molecule, or a mixture of (i) a cyclic compound having —CO— but no NH in the molecule and (ii) a cyclic compound having no —CO— but NH in the molecule, together with polyester capable of having a crystal structure; and

(16) the molded product as described in (15), wherein the molded product is an enclosure for electric or electronic instruments.

BEST MODES FOR CARRYING OUT THE INVENTION

Examples of halogen expressed by $A_3$ and $A_6$ in the general formula (I) include fluorine, chlorine, bromine and iodine. Especially preferable examples of the aliphatic group include straight-chained or branched alkyl group having 1 to 12 carbon atoms such as methyl, ethyl, propyl, butyl, hexyl, octyl and decyl groups; cyclic alkyl groups having 3 to 8 carbon atoms such as cyclopropyl, cyclobutyl, cyclopentyl, cyclohexyl, cycloheptyl and cyclooctyl groups; homoaromatic groups having 6 to 12 carbon atoms such as phenyl and naphthyl group; and 5- to 6-membered heterocyclic groups having 1 to 3 atoms of N, S or O, such as furyl, thienyl, pyridyl and thiazolyl groups. These aliphatic groups and aromatic groups may be substituted. The substituent group per se may be any publicly-known substituent group, and examples thereof include alkyl group, alkoxy group, halogen, amino group, carboxyl group and sulfo group. Also these substituent may further be substituted so far as they are chemically allowable.

Examples of the alkyl group include methyl, ethyl, propyl, isopropyl, butyl, isobutyl, s-butyl, t-butyl, pentyl, isopentyl, neopentyl, hexyl, heptyl, octyl, nonyl, decyl, undecyl, dodecyl, tridecyl, tetradecyl, and pentadecyl groups.

Examples of the alkoxy groups include methoxy, ethoxy, propoxy, isopropoxy, butoxy, isobutoxy, sec-butoxy, tert-butoxy, pentyloxy, neopentyloxy and hexyloxy groups.

Examples of the above-described halogen include fluorine, chlorine, bromine and iodine.

The number of substituent groups in the aliphatic group and aromatic group is not specifically limited, and is preferably 1 to 3 in general.

Examples of the cyclic compound expressed by the general formula (I) and having both of —CO— and —NH— in the molecule include those expressed by the formulae below:

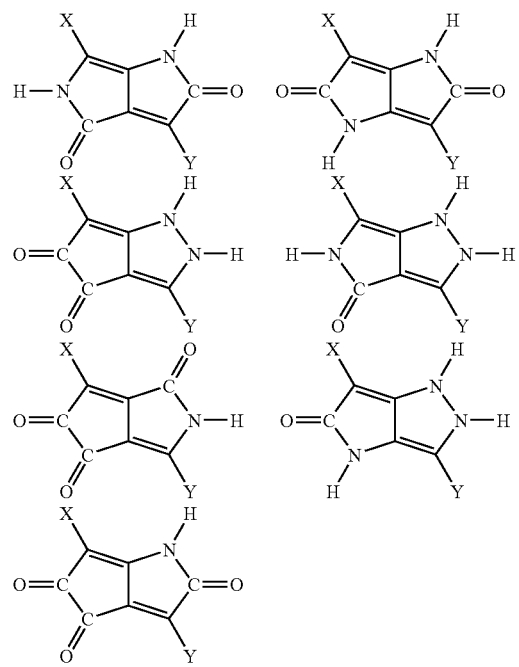

(where, X in the formula is identical to the aforementioned $A_3$, and Y is identical to the aforementioned $A_6$), and more specifically those expressed by the following formulae:

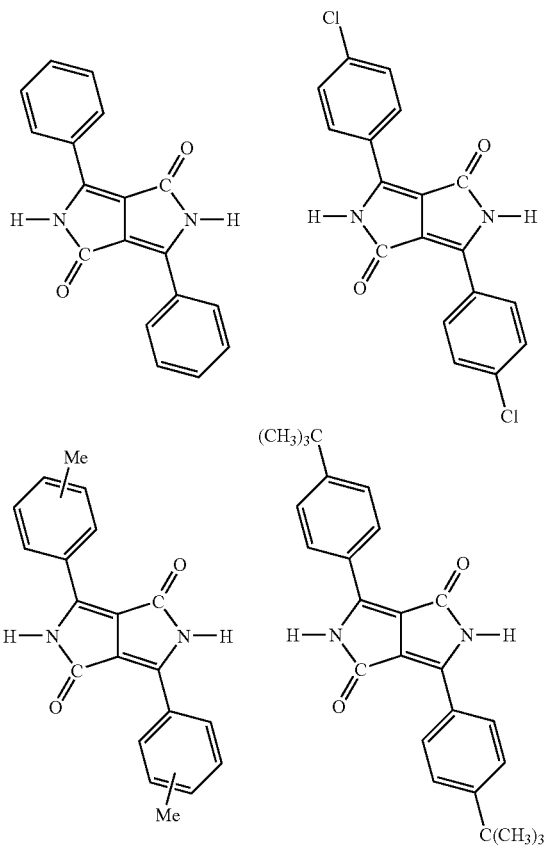

-continued

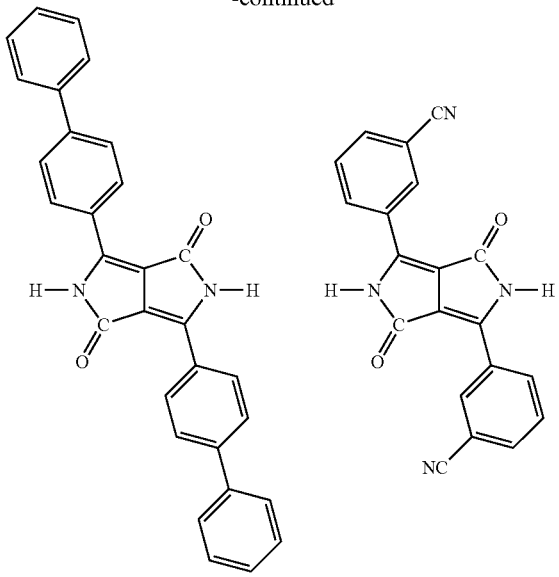

On the other hand, the mixture of (i) the cyclic compound having —CO— but no NH in the molecule and (ii) the cyclic compound having no —CO— but NH in the molecule can be exemplified by a mixture of two compounds expressed by two formulae below:

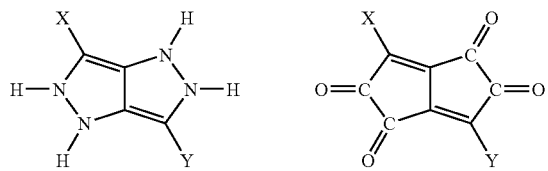

(where, X is identical to the aforementioned $A_3$, and Y is identical to the aforementioned $A_6$).

Therefore, specific examples of the cyclic compound available for the present invention include 1,4-diketo-2,5-dihydro-3,6-diphenylpyrrolo[3,4-c]pyrrole (C.I. Pigment Red 255), 1,4-diketo-2,5-dihydro-3,6-di-(p-chlorophenyl)pyrrolo[3,4-c]pyrrole (C.I. Pigment Red 254), 1,4-diketo-2,5-dihydro-3,6-di-(p-methylphenyl)pyrrolo[3,4-c]pyrrole, 1,4-diketo-2,5-dihydro-3,6-di-(m-methylphenyl)pyrrolo[3,4-c]pyrrole, 1,4-diketo-2,5-dihydro-3-(p-methylphenyl)-6-(m-methylphenyl)pyrrolo[3,4-c]pyrrole (C.I. Pigment Red 272), 1,4-diketo-2,5-dihydro-3,6-di-(p-tert-butylphenyl)pyrrolo[3,4-c]pyrrole (C.I. Pigment Orange 73), 1,4-diketo-2,5-dihydro-3,6-di-(p-biphenyl)pyrrolo[3,4-c]pyrrole (C.I. Pigment Red 264), 1,4-diketo-2,5-dihydro-3,6-di-(m-cyanophenyl)pyrrolo[3,4-c]pyrrole (C.I. Pigment Orange 71), and 1,4-diketo-2,5-dihydro-3,6-di-(m-chlorophenyl)pyrrolo[3,4-c]pyrrole. In the above description, C.I. means color index issued by the Society of Dyers and Colourists.

Particle size of the cyclic compound generally falls in a range not larger than 10 μm, more preferably not larger than 1 μm, and still more preferably not larger than 0.1 μm.

The cyclic compound used in the present invention can readily be manufactured according to any publicly-known methods or some modification of these methods. The cyclic compound used in the present invention may be any commercial products of the above-described compounds. The publicly-known methods include a method disclosed in Japanese Patent Application Publication No. 2001-207075 and a method of D. G. Farnum (1974). For example, non-substituted diketopyrrolopyrrole can be prepared by heating a mixture of succinate diester and benzonitrile in an organic solvent under the presence of a base such as sodium alcholate (Japanese Patent Application Publication No. 2001-207075), and a variety of diketopyrrolopyrroles having substituents introduced therein can be manufactured by using a substituted benzonitrile in place of benzonitrile in the above-described method. In the method, it is also possible to produce a non-diaryl-type pyrrolopyrrole by selecting nitrile. The cyclic compound used in the present invention can be produced also by reacting bromoacetate ester with benzonitrile under the presence of a zinc catalyst (D. G. Farnum et al., 1974).

The resin compound of the present invention contains the polyester capable of having a crystal structure. The polyester capable of having a crystal structure is preferably a biodegradable polyester. The biodegradable polyester of this sort can be exemplified by polyester-base resin metabolizable by microbes, wherein aliphatic polyester in which moldability, heat resistance and impact resistance are well balanced, is particularly preferable.

More preferable examples of the aliphatic polyester include polyoxalate ester, polysuccinate ester, poly(hydroxybutyrate), poly(butyrene diglycolate), polycaprolactone, polydioxanone and polylactate-base aliphatic polyesters. Specific examples of the polylactate-base aliphatic polyesters include polymers or copolymers of oxy acids such as lactic acid, malic acid and glucolic acid. In particular, hydroxycarboxylic-acid-base aliphatic polyesters represented by polylactic acid are preferably used, and among the hydroxycarboxylic-acid-base aliphatic polyesters, polylactic acid is most preferably used.

The biodegradable polyester used in the present invention can be manufactured according to publicly-known methods. For example, it can be manufactured by methods such as lactide method, condensation polymerization of polyhydric alcohol with polybasic acid, and inter-molecular condensation polymerization of hydroxycarboxylic acid having a hydroxyl group and a carboxyl group in one molecule.

In particular, polylactic-acid-base aliphatic polyester can be obtained generally by so-called lactide process, a method based on ring-opening polymerization of lactide, which is a cyclic diester, and correspondent lactones, or by a process other than the lactide process, based on direct dehydration polymerization of lactic acid. Catalysts used for producing the polylactic-acid-base aliphatic polyester can be exemplified by tin, antimony, zinc, titanium, iron and aluminum compounds. Among others, tin-base catalysts and aluminum-base catalysts are more preferably used, and tin octylate and aluminum acetylacetonate are still more preferably used.

Among other polylactic-acid-base aliphatic polyesters, poly(L-lactic acid) obtained by ring-opening polymerization of lactide is preferable. This sort of poly(L-lactic acid) is hydrolyzed to produce L-lactic acid, of which safeness has already been confirmed. The polylactic-acid-base aliphatic polyesters used in the present invention are, however, not limited thereto, so that also lactide used for the production thereof is not limited to L-form compound.

The resin composition of the present invention may contain also a biodegradable resin as the resin component, besides the polyester capable of having a crystal structure. The biodegradable resin in the context of the present invention refers to a resin which can be decomposed after being disposed, in the nature with the aid of microbes into low-molecular-weight compound and finally into water and carbon dioxide (Biodegradable Plastics Society, ISO/TC-207/SC3).

This sort of biodegradable resins have a wide variety including polysaccharide derivatives such as cellulose, starch, dextrane and chitin; peptides such as collagen, casein, fibrin and gelatin; polyamino acid for example; polyvinyl alcohol for example; polyamides such as nylon-4 and nylonh-2/nylon-6 copolymer; and polyesters such as polyglycolic acid, polylactic acid, polysuccinate ester, polyoxalate ester, poly(hydroxylactate), butyrene polyglycolate, polycaprolactone and polydioxanone, wherein all of which available for the present invention. That is, the biodegradable polymer refers to organic materials possibly be decomposed and assimilated by actions of the nature or living organisms, and are ideal materials compatible to the environment. Any materials may be allowable without impairing objects of the present invention.

The biodegradable resin used in the present invention can be manufactured by publicly-known methods or may commercially be available.

The resin composition of the present invention may contain only one species of the above-described biodegradable resins, or may contains two or more species of the biodegradable resins. Two or more biodegradable resins contained therein may form a copolymer, or may exist in a form of mixture.

The resin composition of the present invention may contain resins other than the above-described biodegradable resins. For example, the resin composition of the present invention may contain a resin such as slowly decomposing over a period as long as approximately a decade or two decades, in place of having a decomposition rate as fast as that specified in the aforementioned ISO standard. Examples of resins of this sort include polylactic acid and poly(butyrene succinate) having moderated decomposition rate.

The resin composition of the present invention may further be added with an inorganic filler. The inorganic filler may be any publicly-known ones, and examples thereof include talc, alumina, silica, magnesia, mica and kaolin. Among others, talc is more preferably used because it is effective in promoting the crystallization when used as combined with the nucleating agent, without canceling their effects with each other.

The inorganic filler is preferably added within a range from approximately 1 to 50 parts by weight per 100 parts by weight of the polyester capable of having a crystal structure. The use within the above-described range is successful in avoiding embrittlement of the resultant resin composition.

Suppression of hydrolysis of the polyester is an essential issue in view of long-term reliability of the molded products. It is, therefore, preferable that the resin composition of the present invention is further added with a hydrolysis suppressing agent. The hydrolysis suppressing agent is not specifically limited so far as it can suppress hydrolysis of the biodegradable resin, and is typically exemplified by a compound having a reactivity with an active hydrogen in the biodegradable resin. Addition of the compound makes it possible to reduce the amount of active hydrogen in the biodegradable resin, and to prevent polymer chains of the biodegradable resin from being hydrolyzed by a catalytic action of the active hydrogen. The active hydrogen referred herein is hydrogen which composes a bond of oxygen, nitrogen or the like with hydrogen (N—H bond, O—H bond), wherein this sort of hydrogen has a reactivity larger than that of hydrogen in carbon-hydrogen bond (C—H bond). Specific examples thereof include hydrogen in carboxyl group: —COOH, hydroxyl group: —OH, amino group: —$NH_2$ or amido bond: —NHCO— in the biodegradable resin.

Compounds applicable as the hydrolysis suppressing agent include carbodiimide compounds, isocyanate compounds and oxazoline-base compounds. The carbodiimide compounds are particularly preferable because they can be kneaded under fusion with the biodegradable polymer compounds, and only a small amount of addition thereof is successful in further suppressing hydrolysis of the biodegradable resin.

The carbodiimide compound refers to a compound having one or more carbodiimide groups in a molecule, and includes also polycarbodiimide compounds. Examples of monocarbodiimide compounds in the category of carbodiimide compounds include dicyclohexyl carbodiimide, diisopropyl carbodiimide, dimethyl carbodiimide, diisobutyl carbodiimide, dioctyl carbodiimide, diphenyl carbodiimide and naphthyl carbodiimide. Among others, particularly preferable examples include dicyclohexyl carbodiimide and diisopropyl carbodiimide, which are readily available on the industrial basis.

Examples of the isocyanate compounds include 2,4-tolylene diisocyanate, 2,6-tolylene diisocyanate, m-phenylene diisocyanate, p-phenylene diisocyanate, 4,4-diphenylmethane diisocyanate, 2,4-diphenylmethane diisocyanate, 2,2-diphenylmethane diisocyanate, 3,3-dimethyl-4,4-biphenylene diisocyanate, 3,3-dimethoxy-4,4-biphenylene diisocyanate, 3,3-dichloro-4,4-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohyxylene diisocyanate, 1,4-cyclohexylene diisocyanate, xylylene diisocyanate, tetramethylxylylene diisocyanate, hydrogen-added xylylene diisocyanate, lysine diisocyanate, isophorone diisocyanate, 4,4-dicyclohexylmethane diisocyanate and 3,3-dimethyl-4,4-dicyclohexylmethane diisocyanate.

Examples of the oxazoline-base compounds include 2,2-o-phenylene-bis(2-oxazoline), 2,2-m-phenylene-bis(2-oxazoline), 2,2-p-phenylene-bis(2-oxazoline), 2,2-p-phenylene-bis(4-methyl-2-oxazoline), 2,2-m-phenylene-bis(4-methyl-2-oxazoline), 2,2-p-phenylene-bis(4,4-dimethyl-2-oxazoline), 2,2-m-phenylene-bis(4,4-dimethyl-2-oxazoline), 2,2-ethylene-bis(2-oxazoline), 2,2-tetramethylene-bis(2-oxazoline), 2,2-hexamethylene-bis(2-oxazoline), 2,2-octamethylene-bis(2-oxazoline), 2,2-ethylene-bis(4-methyl-2-oxazoline) and 2,2-diphenylene-bis(2-oxazoline).

The above-described hydrolysis suppressing agent can readily be manufactured according to some publicly-known methods, or may commercially be available in an appropriate manner.

Rate of biodegradation of the resin composition according to the present invention can be adjusted by varying species or amount of addition of the hydrolysis suppressing agent used in the present invention, so that the species and amount of addition of the hydrolysis suppressing agent to be blended may be determined depending on purposes of the products. More specifically, the amount of addition of the hydrolysis suppressing agent is approximately 5% by weight or less, and more preferably 1% by weight or around. The hydrolysis suppressing agent may be any single species of the above-described compounds, or may be combination of two or more of these compound.

The resin composition of the present invention may be added with various publicly-known additives such as an antioxidant, photo stabilizer, ultraviolet absorber, pigment, colorant, antistatic agent, mold releasing agent, perfume, lubricant, flame retarder, filler and antiseptic/mildewproof agent depending on needs so far as they will not considerably degrade the crystallinity.

The resin composition of the present invention can be manufactured by mixing the above-described cyclic compound or its mixture, the polyester capable of having a crystal structure, and other components depending on needs. A more detailed method of manufacturing the resin composition of the present invention using the individual components is such as mixing the biodegradable resin, as a source material, with an optional inorganic filler, a hydrolysis suppressing agent and so forth, and kneading the mixture under fusion using an extrusion machine. Another allowable example of the manufacturing method is so-called solution process. The solution process referred herein is a process of using an arbitrary solvent capable of dispersing and dissolving therein the individual components, thoroughly stirring the individual components as the source materials and the solvent so as to prepare a slurry, and then removing the solvent by drying. It is, however, to be understood that the method of manufacturing the resin composition of the present invention is by no means limited thereto, wherein any other publicly-known methods are available.

It is essential in the present invention that the biodegradable polyester contains, as being uniformly micro-dispersed therein, either a cyclic compound expressed by general formula (I) having both of —CO— and —NH— in the molecule, or a mixture of (i) a cyclic compound having —CO— but no NH in the molecule and (ii) a cyclic compound having no —CO— but NH in the molecule. This can be accomplished by publicly-known methods. For example, a method of allowing a pigment to disperse and to color the resin may be a good reference. A three-roll machine can typically be used. Another possible method relates to repetition of kneading under heating, wherein the individual steps are simple but the method takes a long time.

The resin composition for molding of the present invention can widely applied to molded products. By virtue of its excellence in crystallinity, rigidity, and also in transparency in some cases as described in the above, the resin composition is preferably used for the products for which the above-described properties are demanded. The molded products can typically be used as enclosures of television set, portable music reproduction device, stereo set, CD player, video deck and personal computer. Among others, it is preferably used as enclosures of television set and personal computer, which are vast in the amount of disposal, wherein it is all enough to subject the used products to biodegradation processing before disposal. This is advantageous in avoiding an excessive energy consumption for the disposal.

EXAMPLE 1

The polyester capable of having a crystal structure used herein was polylactic acid H100J (product of Mitsui Chemicals, Inc.). The polylactic acid has a molecular weight of 200,000.

The cyclic compound used herein was C.I. Pigment Red 272 (product of Ciba Fine Chemicals Inc., CROMOPHTAL DPP Flame Red FP). The particle diameter of which was estimated as submicrometers based on its surface area of 25.6 $m^2/g$.

The cyclic compound was mixed in a ratio of 0.5 parts by weight per 100 parts by weight of polylactic acid, kneaded under heating, and pelletized to thereby obtain a resin composition for molding according to Example 1.

Ratio of crystallization of the resin composition for molding was evaluated through differential scanning calorimetry (DSC) based on a method described in Japanese Patent Application Publication No. HEI 10-158369. The sample was once heated to 200° C., then cooled to 0° C. at a cooling rate of 50° C./min, and the measurement was made at a rate of temperature elevation of 20° C./min.

The ratio of crystallization defined by the equation below was found based on calorific value at around 100° C. ascribable to the crystallization and endothermic value at around 160° C. ascribable to melting:

Ratio of crystallization (%)

=(1−calorific value ascribable to crystallization/endothermic value ascribable to melting)×100

Viscoelasticity was also measured. Five grams of the resin composition for molding was melted at 180° C. and pressed using a 1-mm-thick frame spacer on a hot press machine, allowed to stand for natural cooling, to thereby obtain a plate of approximately 7 cm in diameter and 1 mm in thickness. A test piece was cut out from the plate by machining, and subjected to measurement of viscoelasticity in order to find mechanical strength.

The method of measurement is characterized by the followings:

Test piece: 50 mm long×7 mm wide×1 mm thick
Measurement apparatus: viscoelasticity analyzer RSA-II (product of Rheometric Scientific Inc.)
Measurement geometry: dual cantilever bending
Frequency: 6.28 (rad/s)
Start temperature of measurement: 0 (° C.)
Final temperature of measurement: 160 (° C.)
Temperature elevation rate: 5 (° C./min)
Distortion: 0.05 (%)

The measurement method is based on combination of measurements of tensile elasticity and bending elasticity. Observation of viscoelasticity at around 80° C. gives information on whether the crystallization is promoted or not.

In general, increase in overall rate of crystallization of crystalline resin typically through addition of a nucleating agent is successful in shortening-molding time in injection molding. This means improvement in the productivity, and results in improvement in the production cost. When compared under an equal molding time, a faster overall rate of crystallization results in a larger degree of crystallization of the molded product, and thereby the rigidity can be improved.

In the present study, the overall rate of crystallization (crystallization time) was measured as an index for indicating improvement in moldability, through taking pictures under a polarization microscope. A small amount of the resin composition was placed on a thin glass plate (0.1 mm thick or around), heated to 200° C. on a hot stage, further covered with a thin glass plate, to thereby obtain a sandwich-formed sample for observation. In some cases herein, a metal ring of 0.1 mm thick was used as a spacer between the glass plates. The sample heated to 200° C. was cooled at a rate of 90° C./min and kept at 120° C., and observed under crossed nicols. Crystal of polylactic acid shows birefringence, so that crystal growth of which can be observed under the crossed nicols. A field of observation gradually becomes brighter as a whole with progress of the crystal growth, and the brightness of the field of observation saturates at a certain level.

A picture of the field of observation was taken by a monochrome CCD video camera, and incorporated into an image capture board of a personal computer. An average values of brightness at the center of the field of observation (simply referred to as "brightness", hereinafter) was determined, and plotted with respect to the time. In this Example, time zero was defined as a time the temperature started to descend from 200° C. Referring now to Comparative Example 1, it took 53 seconds to reach 120° C.

Crystallization time was determined as follows. Rise-up of the brightness was extrapolated by a straight line, a saturated brightness was also extrapolated by another straight line, and time correspondent to the intersection of the straight lines was read. The crystallization time was determined based on the time the temperature reached 120° C.

Results of the measurement are shown in Table 1. Both of the ratio of crystallization and mechanical strength were found to be improved from those in Comparative Example 1 described later using polylactic acid only.

Results of the measurement are shown in Table 1.

EXAMPLE 2

A resin composition comprising 100 parts by weight of polylactic acid and 0.5 parts by weight of C.I. Pigment Red 254 (product of Ciba Fine Chemicals, CROMOPHTAL DPP Red BP) was prepared similarly to as described in Example 1. The cyclic compound was found to have a surface area of 28.7 $m^2/g$, and a particle size of 0.2 μm or around based on a photograph taken under an electron microscope.

The resin composition was evaluated in a similar manner. Results are shown in Table. 1.

EXAMPLE 3

A resin composition 3A comprising 100 parts by weight of polylactic acid and 0.5 parts by weight of C.I. Pigment Red 254 (product of Ciba Fine Chemicals, IRGAZIN DPP Red BTR) was prepared similarly to as described in Example 1. Resin compositions 3B, 3C were also similarly prepared using 0.1 parts by weight and 0.01 parts by weight, respectively, of the cyclic compound. The cyclic compound was found to have a surface area of 93.8 $m^2/g$, and a particle size of 50 nm or around based on a photograph taken under an electron microscope.

The resin compositions were evaluated in a similar manner. Results are shown in Table. 1. Comparison between Example 2 and Example 3 revealed a major difference therebetween in that the cyclic compound in Example 3 had a smaller particle size. It was shown that the cyclic compound having a smaller particle size worked better when compared under an equal amount of addition. It can be understood that the cyclic compound having a smaller particle size can act as a larger number of primary crystal nuclei with respect to the polyester capable of having a crystal structure.

The 1-mm-thick plates made of the resin composition based on smaller amounts of addition were found to have transparency although colored in red. It was considered that this sort of resin composition may conveniently be used in some applications.

As is obvious from the above, the crystallinity of the resin becomes very high if a sufficient amount of nucleating agent for microcrystal is uniformly dispersed into the resin. Thus crystallized resin has the crystals having a size smaller than wavelength of light, and this consequently raises the transparency. That is, thus obtained resin composition has both of heat resistance and transparency.

COMPARATIVE EXAMPLE 1

A resin composition composed only of the aforementioned H100J, as lactic acid, was obtained following the preparation procedures under the same conditions as those in the aforementioned Examples, or more specifically, by kneading under heating and by pelletizing. The product was evaluated similarly to as described in the above, and results were shown in Table 2.

COMPARATIVE EXAMPLE 2

A resin composition comprising 100 parts by weight of polylactic acid and 0.5 parts by weight of calcium stearate (product of Kanto Kagaku) was similarly prepared. The resin composition was similarly evaluated. Results are collectively shown again in Table 2.

It was certainly found that the ratio of crystallization was slightly improved, proving a known effect of salts of long-chain carboxylic acids as a nucleating agent possibly exerted on polylactic acid.

COMPARATIVE EXAMPLE 3

A resin composition comprising 100 parts by weight of polylactic acid and 0.5 parts by weight of bis(p-methylbenzylidene)sorbitol (product of New Japan Chemical Co., Ltd., Gelol MD) was similarly prepared. The resin composition was evaluated similarly to as described in the above Examples. Results are collectively shown again in Table 2.

Bis(p-methylbenzylidene)sorbitol was proposed by the prior art as a nucleating agent. A series of the present evaluation, however, revealed only an extremely small effect the compound.

The amount of addition increased to as much as 2 parts by weight still failed in showing a distinct effect.

TABLE 1

| | | Biodegradable resin | (parts by weight) | Additive | (parts by weight) | Ratio of crystallization (%) | Viscoelasticity at 80° C. (MPa) | Crystallization time (sec) |
|---|---|---|---|---|---|---|---|---|
| Example | 1 | Polylactic acid H100J | 100 | Pigment Red 272 (CROMOPHTAL DPP Flame Red FP) | 0.5 | 70 | 161 | 55 |
| | 2 | Polylactic acid H100J | 100 | Pigment Red 254 (CROMOPHTAL DPP Red BP) | 0.5 | 100 | 654 | 32 |
| | 3A | Polylactic acid H100J | 100 | Pigment Red 254 (IRGAZIN DPP Red BTR) | 0.5 | 100 | 880 | 22 |
| | 3B | Polylactic acid H100J | 100 | Pigment Red 254 (IRGAZIN DPP Red BTR) | 0.1 | 100 | 622 | 32 |

TABLE 1-continued

|  | Biodegradable resin | (parts by weight) | Additive | (parts by weight) | Ratio of crystallization (%) | Viscoelasticity at 80° C. (MPa) | Crystallization time (sec) |
|---|---|---|---|---|---|---|---|
| 3C | Polylactic acid H100J | 100 | Pigment Red 254 (IRGAZIN DPP Red BTR) | 0.01 | 92 | 201 | 42 |

TABLE 2

|  |  | Biodegradable resin | (parts by weight) | Additive | (parts by weight) | Ratio of crystallization (%) | Viscoelasticity at 80° C. MPa) | Crystallization time (sec) |
|---|---|---|---|---|---|---|---|---|
| Comparative Example | 1 | Polylactic acid H100J | 100 |  |  | 7 | 20 | 237 |
|  | 2 | Polylactic acid H100J | 100 | Calcium stearate | 0.5 | 12 |  | 207 |
|  | 3 | Polylactic acid H100J | 100 | Bis(p-methyl-benzylidene) sorbitol | 0.5 | 7 |  | 212 |

The resin composition of the present invention is excellent in the rigidity by virtue of its large degree of crystallization. It is also excellent in the moldability. It is still also widely applicable by virtue of its excellent transparency in some cases. The resin composition after disposal can be decomposed in the natural environment, and this highly appreciates the present invention in view of global environmental preservation.

The invention claimed is:

1. A highly crystallized resin composition comprising a cyclic compound which is any one of 1,4-diketo-2,5-dihydro-3,6-diphenylpyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-d-iketo-2,5-dihydro-3,6-di-(m-methylphenyl) pyrrolo[3,4-c] pyrrole and 1,4-diketo-2,5-dihydro-3-(p-methylphenyl)-6-(m-methylphenyl)pyrrolo[3,4-c-]pyrrole, together with a polyester capable of having a crystal structure, wherein said polyester is a biodegradable polyester, which is polylactic acid, and wherein a blending ratio of said cyclic compound falls in a range from 0.001 to 0.1 parts by weight per 100 parts by weight of said polyester.

2. The resin composition as described in claim 1, wherein $A_1$ represents —CO—, $A_2$ represents —NH—, $A_4$ represents —CO—, and $A_5$ represents –NH—.

3. The resin composition as described in claim 1, wherein a particle size of said cyclic compound falls in a range not larger than 10 μm.

4. The resin composition as described in claim 1, wherein said resin composition is adapted for use in molding.

5. The resin composition as described in claim 1, wherein an inorganic filler is further added.

6. The resin composition as described in claim 5, wherein said inorganic filler is talc.

7. The resin composition as described in claim 5, wherein a blending ratio of said inorganic filler falls in a range from 1 to 50 parts by weight per 100 parts by weight of said resin composition for molding.

8. The resin composition as described in claim 1, further comprising a hydrolysis suppressing agent.

9. The resin composition as described in claim 8, wherein said hydrolysis suppressing agent contains a compound having a carbodiimide group.

10. A method of promoting the crystallization of a biodegradable polyester comprising a step of mixing a cyclic compound which is any one of 1,4-diketo-2,5-dihydro-3,6-diphenylpyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-d-iketo-2,5-dihydro-3,6-di-(m-methylphenyl) pyrrolo[3,4-c] pyrrole and 1,4-diketo-2,5-dihydro-3-(p-methylphenyl)-6-(m-methylphenyl)pyrrolo[3,4-c-]pyrrole, together with a polyester capable of having a crystal structure, wherein said polyester is a biodegradable polyester, which is polylactic acid, and wherein a blending ratio of said cyclic compound falls in a range from 0.001 to 0.1 parts by weight per 100 parts by weight of said polyester.

11. A highly crystallized molded product containing a resin composition, said resin composition comprising a cyclic compound which is any one of 1,4-diketo-2,5-dihydro-3,6-diphenylpyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-d-iketo-2,5-dihydro-3,6-di-(m-methylphenyl) pyrrolo[3,4-c] pyrrole and 1,4-diketo-2,5-dihydro-3-(p-methylphenyl)-6-(m-methylphenyl)pyrrolo[3,4-c-]pyrrole, together with a polyester capable of having a crystal structure, wherein said polyester is a biodegradable polyester, which is polylactic acid, and wherein a blending ratio of said cyclic compound falls in a range from 0.001 to 0.1 parts by weight per 100 parts by weight of said polyester.

12. The molded product as described in claim 11, wherein said molded product is an enclosure for electric or electronic instruments.

* * * * *